(12) United States Patent
Kowol

(10) Patent No.: US 12,234,936 B2
(45) Date of Patent: Feb. 25, 2025

(54) WATER HOSE CONNECTION CLIP

(71) Applicant: Neoperl GmbH, Müllheim (DE)

(72) Inventor: Jacek Kowol, Gundelfingen (DE)

(73) Assignee: NEOPERL GMBH, Muellheim (DE)

( * ) Notice: Subject to any disclaimer, the term of this patent is extended or adjusted under 35 U.S.C. 154(b) by 0 days.

(21) Appl. No.: 18/036,983

(22) PCT Filed: Dec. 6, 2021

(86) PCT No.: PCT/EP2021/084421
§ 371 (c)(1),
(2) Date: May 15, 2023

(87) PCT Pub. No.: WO2022/128575
PCT Pub. Date: Jun. 23, 2022

(65) Prior Publication Data
US 2024/0019059 A1    Jan. 18, 2024

(30) Foreign Application Priority Data
Dec. 18, 2020   (DE) .......................... 202020107414.8

(51) Int. Cl.
*F16L 37/12*   (2006.01)
*F16L 37/14*   (2006.01)
*F16L 37/56*   (2006.01)

(52) U.S. Cl.
CPC ........... *F16L 37/1225* (2013.01); *F16L 37/56* (2013.01); *F16L 37/144* (2013.01)

(58) Field of Classification Search
CPC ..... F16L 3/2235; F16L 37/1225; F16L 37/56; F16L 37/0841; F16L 37/142; F16L 37/144; F16L 33/03; F16L 39/02; F16L 37/12; F16L 37/0985
See application file for complete search history.

(56) References Cited

U.S. PATENT DOCUMENTS

| | | | | |
|---|---|---|---|---|
| 4,544,185 | A | * | 10/1985 | Weirich ................. F16L 39/02 |
| 5,029,782 | A | * | 7/1991 | Andre ................... F16L 3/2235 |
| 5,275,443 | A | * | 1/1994 | Klinger ............... F16L 37/0985 |
| 5,816,621 | A | * | 10/1998 | Frost ....................... F16L 37/56 |
| 2003/0178844 | A1 | * | 9/2003 | Klinger ................. F16L 37/144 |
| 2007/0000833 | A1 | | 1/2007 | Levy et al. |
| 2008/0264605 | A1 | * | 10/2008 | Tchang .................. F16L 37/56 |
| 2012/0018020 | A1 | | 1/2012 | Moore et al. |
| 2013/0082459 | A1 | * | 4/2013 | Kaneko ............... F16L 37/0841 |
| 2013/0221665 | A1 | | 8/2013 | Okazaki |
| 2020/0041012 | A1 | * | 2/2020 | Chang |

FOREIGN PATENT DOCUMENTS

| | | |
|---|---|---|
| DE | 102004023867 | 11/2005 |
| DE | 102012006443 | 10/2012 |
| DE | 102016008398 | 1/2018 |
| DE | 102017220448 | 5/2019 |
| EP | 0908659 | 4/1999 |

* cited by examiner

*Primary Examiner* — William S. Choi
(74) *Attorney, Agent, or Firm* — Volpe Koenig

(57) ABSTRACT

A hose connection (1) having at least one hose receptacle (3a), into which a hose end (4a) can be introduced, wherein a clip (6) extends through the at least one hose receptacle (3a) in order to engage into a clip receptacle (9a) of the hose end (4a). The clip (6) is designed to be self-retaining at the at least one hose receptacle (3a).

19 Claims, 6 Drawing Sheets

WATER HOSE CONNECTION CLIP

CROSS-REFERENCE TO RELATED APPLICATIONS

This application is a 371 National Phase of International Application No. PCT/EP2021/084421, filed Dec. 6, 2021, which claims priority to German Patent Application No. 20 2020 107 414.8, filed Dec. 18, 2020, both of which are incorporated herein by reference as if fully set forth.

TECHNICAL FIELD

The invention relates to a hose connection having at least one hose receptacle into which a hose end can be introduced. For example, the hose connection comprises a plurality of hose receptacles into which one respective hose end can be introduced.

BACKGROUND

A plurality of hose ends from a plurality of hoses can be attached to such a hose connection. For example, an outlet and one or more inlets in which, for example, cold and warm water can be supplied separately from one another in a mixing chamber, are attached thereto.

Various connectors are known for such hose connections, the connectors coupling the respective hose end to the hose receptacle. For example, adhesive screw connections or metal locking plates to be introduced transversely are provided to this end.

Such connections, however, have the drawback that they are difficult to produce, difficult to handle or only able to be released with difficulty or not at all.

SUMMARY

The object of the present invention, therefore, is to improve the hose connection and to facilitate the connection of a hose end to the hose connection.

This object is achieved in the hose connection of the type mentioned in the introduction, in particular, in that a clip extends through the at least one hose receptacle in order to engage in a clip receptacle of the hose end, wherein the clip is designed to be self-retaining on the at least one hose receptacle.

For example, in one embodiment it is provided that the at least one hose receptacle is configured on a hose holder or a housing and the clip extends through the housing in the region of the hose receptacle, in particular through a locking opening of the housing, wherein the clip is designed to be self-retaining on the housing in the region of the hose receptacle.

The invention is based on the recognition that the connection of the hose end or the hose ends to the hose connection is facilitated by the use of a clip which is designed to be self-retaining on the hose receptacle or can be clipped thereto, and which at the same time extends through the hose receptacles such that it engages in a clip receptacle at the hose end. For example, the clip is able to be clipped in a releasable manner to the hose receptacle. The described hose connection thus facilitates, in particular, the connection of a hose end to the hose connection without the use of adhesive or facilitates the replacement of a hose end on the hose connection.

In a further embodiment, it is provided that the clip is configured in one piece. Moreover, in a further embodiment it is provided that the clip is formed from a resilient material.

The resilient properties of the clip permit the clip to be able to be positively connected to the hose receptacle or to the housing. In particular, the clip can be attached at the side to the hose receptacle or to the housing, so that the clip encloses the hose receptacle or the housing. This facilitates the attachment of the clip to the hose receptacle or to the housing and the release thereof.

In one embodiment, it is provided that the clip comprises at least one bearing surface which at least partially bears against the housing, preferably at least partially engages around the housing.

The bearing surface of the clip, which is preferably formed from a resilient material, represents a particularly simple means of engaging around the housing and locking or clipping the clip onto the hose receptacle or the housing in a self-retaining manner.

In one embodiment, it is provided that the clip comprises at least one locking projection, wherein the at least one locking projection extends through at least one hose receptacle, in particular a plurality of hose receptacles.

For example, the clip comprises a plurality of locking projections which, in each case extend through one or more hose receptacles, through one or more locking openings. This can ensure a secure retention of the hose ends in the hose receptacles. Moreover, a plurality of hose ends can be retained in a simple manner in a plurality of hose receptacles by means of a single clip in the hose receptacles.

In one embodiment, it is provided that the at least one locking projection protrudes from the at least one bearing surface and/or wherein the at least one bearing surface encloses the at least one locking projection.

In this embodiment, if the locking projection engages through the locking opening or into the locking opening, the bearing surface is positioned adjacent to the locking opening and locks the clip on the hose receptacle or the housing, or provides the locking clip with a secure retention on the hose receptacle or on the housing.

In one embodiment, it is provided that the clip engages around the at least one hose receptacle over at least half of the circumference.

To this end, the clip can engage around a plurality of hose receptacles, for example, and in each case partially bear against the plurality of hose receptacles or the corresponding housings. This has the advantage that the locking clip is positively or non-positively connected to the hose receptacle(s) or the housing(s). This permits a secure retention of the clip on the housing(s) or on the hose receptacle(s).

In one embodiment, it is provided that the clip comprises a plurality of locking projections, wherein one of the plurality of locking projections protrudes beyond another of the plurality of locking projections in a longitudinal direction.

For example, the clip comprises two outer locking projections which engage around and extend through one or more hose ends and a central longer locking projection which extends through the one or more hose ends. The central locking projection can pre-fix or position the hose ends when introducing the locking clip such that the clip can be simply positioned thereon.

In one embodiment, it is provided that the clip has at least one latching means, wherein the at least one latching means locks the clip in at least one direction of movement of the clip, preferably transversely to the direction of introduction of the hose end.

Thus it is possible to prevent the clip from being fully released from the hose receptacle when the clip is pulled off the hose receptacle.

In one embodiment, it is provided that the at least one latching means engages behind an undercut on or in the region of the hose receptacle. This has the advantage of a simplified attachment and locking of the clip on the hose receptacle.

In one embodiment, it is provided that the at least one latching means locks the clip in a latching position and the clip does not extend through the at least one hose receptacle in the latching position.

For example, the at least one latching means is configured in the extension of at least one respective locking projection. In particular, in each case a latching means can be configured in each case in the extension of an outer locking projection of the plurality of locking projections. Thus the clip can be retained in the latching position, while the hose end can be introduced into the hose receptacle. This prevents the loss of the clip when the hose ends are introduced or replaced.

BRIEF DESCRIPTION OF THE DRAWINGS

The invention is described in more detail hereinafter with reference to several preferred exemplary embodiments.

In the drawings.

DETAILED DESCRIPTION

Figure 1:
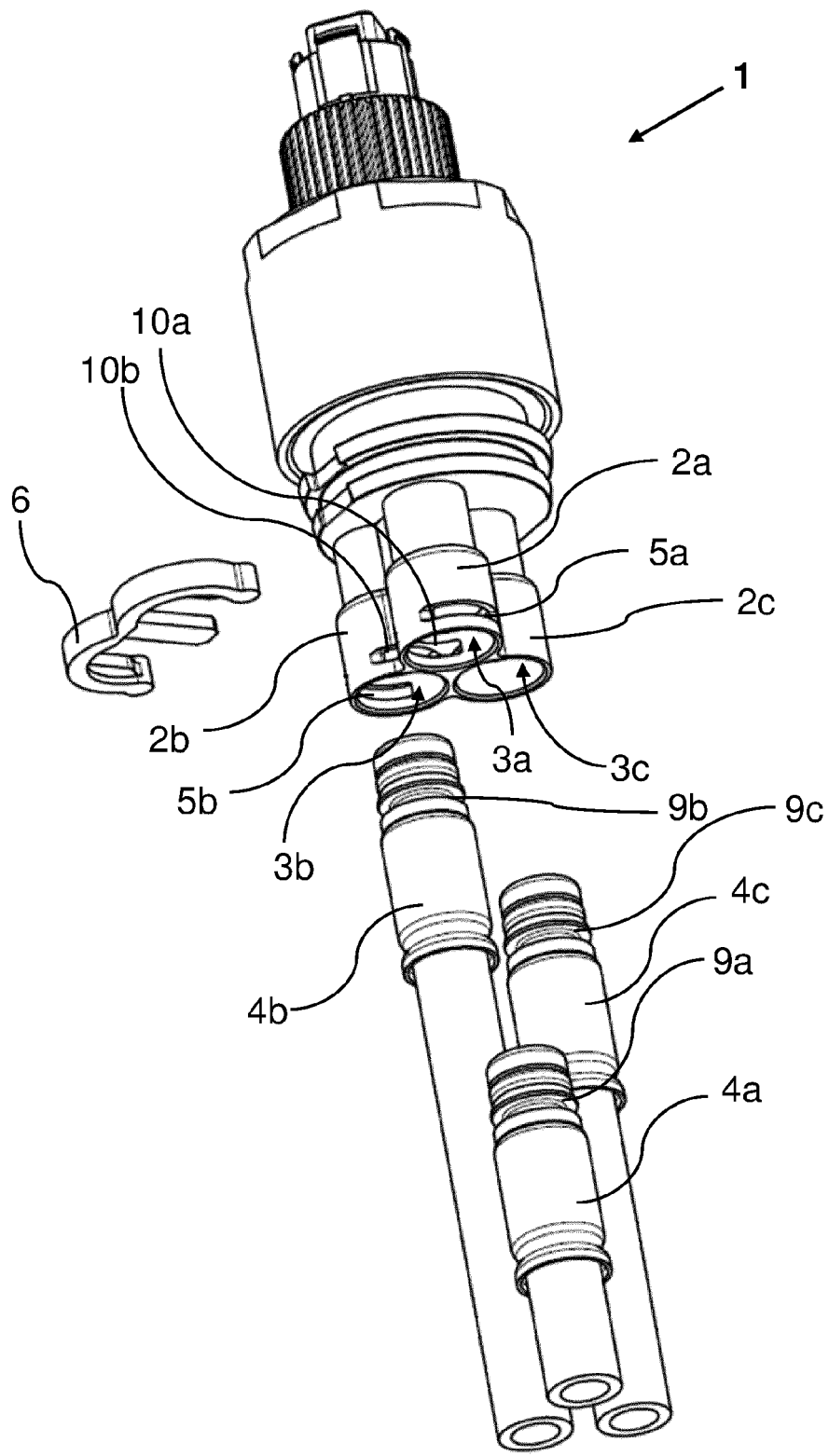
FIG. 1 shows a three-dimensional exploded view of a hose connection.
Figure 2:
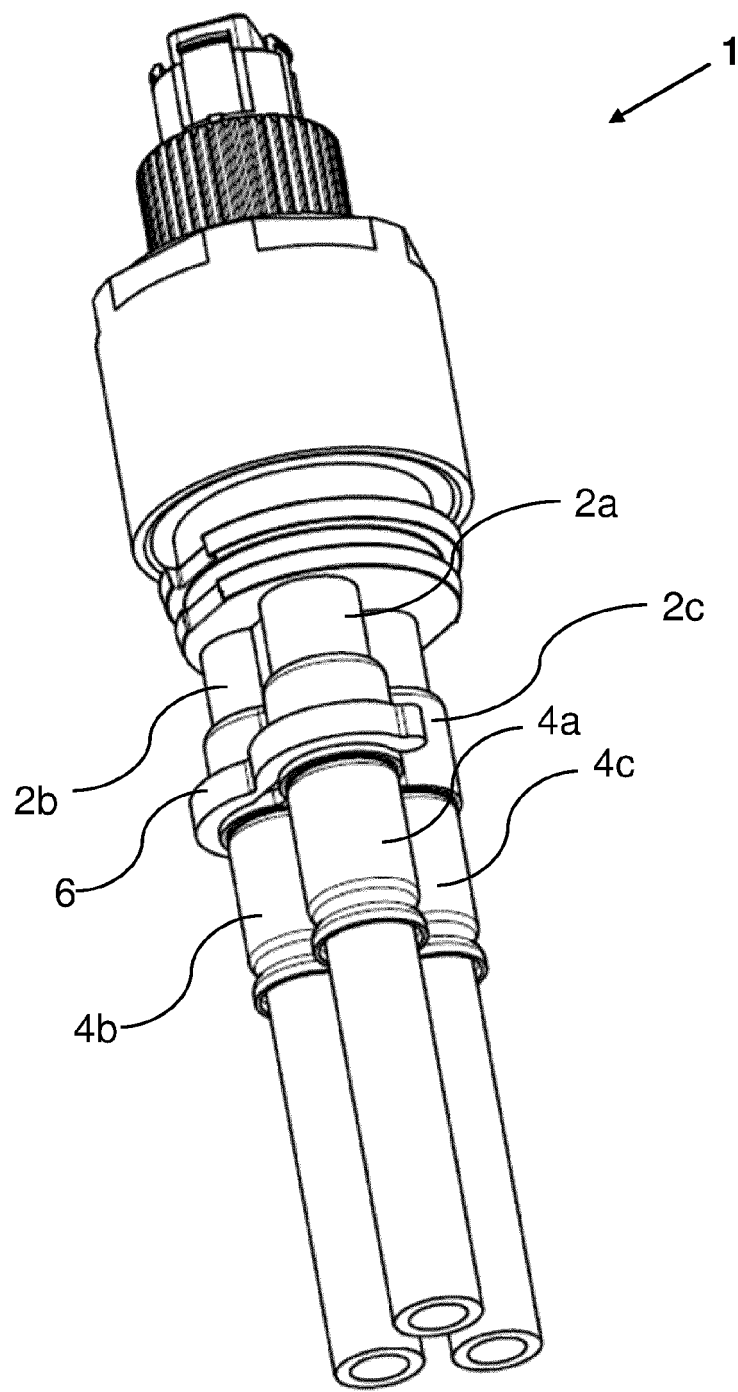
FIG. 2 shows a three-dimensional view of the hose connection in the assembled state.

FIG. 1 shows a three-dimensional exploded view of a hose connection 1. FIG. 2 shows a three-dimensional view of the hose connection in the assembled state. The same features are provided with the same reference signs. The hose connection 1 comprises a hose receptacle 3a into which a hose end 4a can be introduced. The hose connection 1 also has a second hose receptacle 3b and a third hose receptacle 3c, into which one respective second hose end 4b and third hose end 4c can be introduced. The hose connection 1 comprises a clip 6 which, in the assembled state of the hose receptacle 3a with the clip 6, extends through the hose receptacle 3a. The clip 6 also extends through the second hose receptacle 3b and the third hose receptacle 3c.

The hose receptacles 3a, 3b, 3c are configured on one respective first, second and third housing 2a, 2b, 2c.

The housings 2a, 2b, 3c comprise in each case at least one locking opening. In the example shown, the first and the second housing 2a, 2b in each case comprise a first locking opening 5a, 5b and in each case a second locking opening 10a, 10b.

In the assembled state, the clip 6 extends through the first housing 2a and the second housing 2b in the region of the first and second hose receptacle 3a, 3b in which the clip 6 extends through the locking openings 5a, 5b, 10a, 10b or engages therein.

In the assembled state of the clip 6 and the hose connection 1, the clip 6 is designed to be self-retaining in the region of the hose receptacles 3a, 3b. The clip 6 is designed to be self-retaining on the first housing 2a and the second housing 2b.

Figure 3:
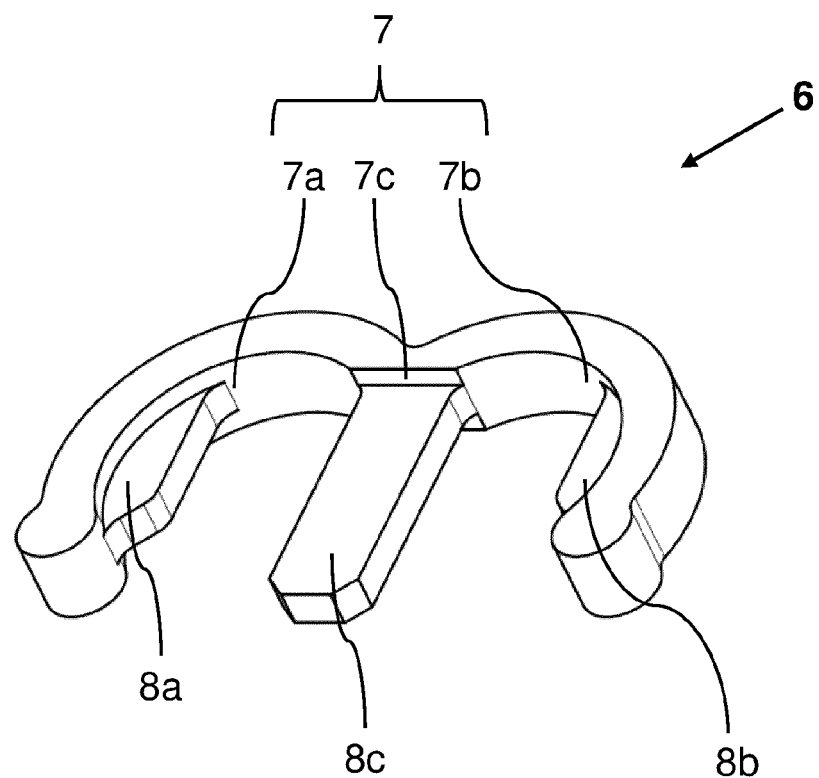
FIG. 3 shows a three-dimensional view of a clip in a first embodiment.

FIG. 3 shows the clip 6 in a first embodiment in a three-dimensional view. The clip 6 is configured in one piece. The clip 6 comprises a bearing surface 7. The clip 6 comprises two outer locking projections 8a, 8b and a central locking projection 8c. At least the outer locking projections 8a, 8b protrude from the bearing surface 7. At least the outer locking projections 8a, 8b are enclosed by the bearing surface 7. The locking projections 8a, 8b, 8c are designed to be elongated. The central locking projection 8c is longer than the outer locking projections 8a, 8b. In other words: the central locking projection 8c protrudes beyond the outer locking projections 8a, 8b in a longitudinal direction of the locking projections 8a, 8b, 8c.

The bearing surface 7 comprises a first bearing surface 7a, a second bearing surface 7b and a third bearing surface 7c. The first outer locking projection 8a protrudes from the first bearing surface 7a or is enclosed by the first bearing surface 7a. The second outer locking projection 8b protrudes from the second bearing surface 7b or is enclosed by the second bearing surface 7b. The central locking projection 8c is arranged between the first and the second bearing surfaces 7a, 7b. In the assembled state of the clip 6 to the hose connection 1, the first bearing surface 7a bears against the first housing 2a and the second bearing surface 7b bears against the second housing 2b.

The central locking projection 8c protrudes, in the example shown, beyond the bearing surface 7 or the first and second bearing surfaces 7a, 7b in the longitudinal direction, wherein the bearing surface 7 or the first and second bearing surfaces 7a, 7b has or have a curvature toward the longitudinal direction.

In the example shown, the central locking projection 8c protrudes from the third bearing surface 7c or is enclosed thereby.

As can be identified in FIGS. 1 and 2, the clip 6 bears against the hose connection 1 in the region of the first hose receptacle 3a. The clip 6 also bears against the hose connection 1 in the region of the second hose receptacle 3b. In other words: the clip 6 bears against the housings 2a, 2b in the region of the hose receptacles 3a, 3b.

The clip 6 engages around the first hose receptacle 3a and the second hose receptacle 3b or the first housing 2a and the second housing 2b. The clip 6 or the bearing surface 7 engages around the first hose receptacle 3a and the second hose receptacle 3b or the first housing 2a and the second housing 2b, in each case over more than half of the circumference of the first hose receptacle 3a and the second hose receptacle 3b or the first housing 2a and the second housing 2b.

The clip 6 is at least partially formed from a resilient material. The clip 6 is able to be introduced in a transverse direction into the locking openings 5a, 5b, 10a, 10b transversely to the direction of introduction of the hose ends 3a, 3b. The clip 6 can be clipped to the housing 2a, 2b due to its resilient shape. In the assembled state, the transverse direction corresponds to the longitudinal direction of the elongated locking projections.

The central locking projection 8c is able to be introduced into the second locking openings 10a, 10b without the clip 6 or the bearing surface 7 engaging around the housing 2a, 2b. The central locking projection 8c represents a guide element when the clip 6 is introduced into the first locking openings 5a, 5b of the housing 2a, 2b.

In the assembled state, the outer locking projections 8a, 8b in each case extend through one of the first locking openings 5a, 5b of the housing 2a, 2b. The central locking projection 8c extends through the second locking openings 10a, 10b of the housing 2a, 2b. The central locking projection additionally extends through a third locking opening 11 (see FIGS. 4A, 4B, and 4C) in the third housing 2c in the region of the third hose receptacle 3c.

In the assembled state, the first outer locking projection 8a engages in a first clip receptacle 9a of the first hose end 4a. In the example shown, the first clip receptacle 9a is designed as a tapering of the circumference of the first hose end 4a. In the assembled state, the second outer locking projection 8b engages in a second clip receptacle 9b of the second hose end 4b or in a tapering of the circumference of the second hose end 4b. In the assembled state, the central locking projection 8c also engages in a third clip receptacle 9c of the third hose end 4c or in a tapering of the circumference of the third hose end 4c. In other words: the central locking projection 8c is in contact with the third hose end 4c. In this manner, the central locking projection 8c secures the third hose end 4c in the third hose receptacle 3c. Moreover, in the assembled state the central locking projection 8c in each case engages in the first and second clip receptacles 9a, 9b or in one respective tapering of the circumference of the first and second hose end 4a, 4b or in further clip receptacles of the first and second hose end 4a, 4b.

In other words: the clip 6 secures the first hose end 4a and the second hose end 4b in each case on both sides, namely the first hose end 4a by means of the first outer locking projection 8a and the central locking projection 8c, and the second hose end 4b by means of the second outer locking projection 8b and the central locking projection 8c. The clip 6 secures the third hose end 4c at intervals by means of the central locking projection 8c. Preferably, the first and second hose ends 4a, 4b are encompassed by pressurized hoses in each case. For example, the first hose end 4a is encompassed by a cold water connection and the second hose end 4b is encompassed by a hot water connection. Moreover, the third hose end 4c is preferably encompassed by a low pressure hose. For example, the third hose end 4c is encompassed by a waste water connection or a mixed water connection.

When introducing the clip, the central locking projection 8c engages in the first and second clip receptacle 9a, 9b or in the further clip receptacles of the hose ends 4a, 4b, before the outer locking projections 8a, 8b engage in the locking openings 5a, 5b or in the first and second clip receptacle 9a, 9b. In this manner, the central locking projection 8c can pre-fix the first and the second hose end 4a, 4b before the outer locking projections 8a, 8b engage in the first and second clip receptacle 9a, 9b.

Figure 4:
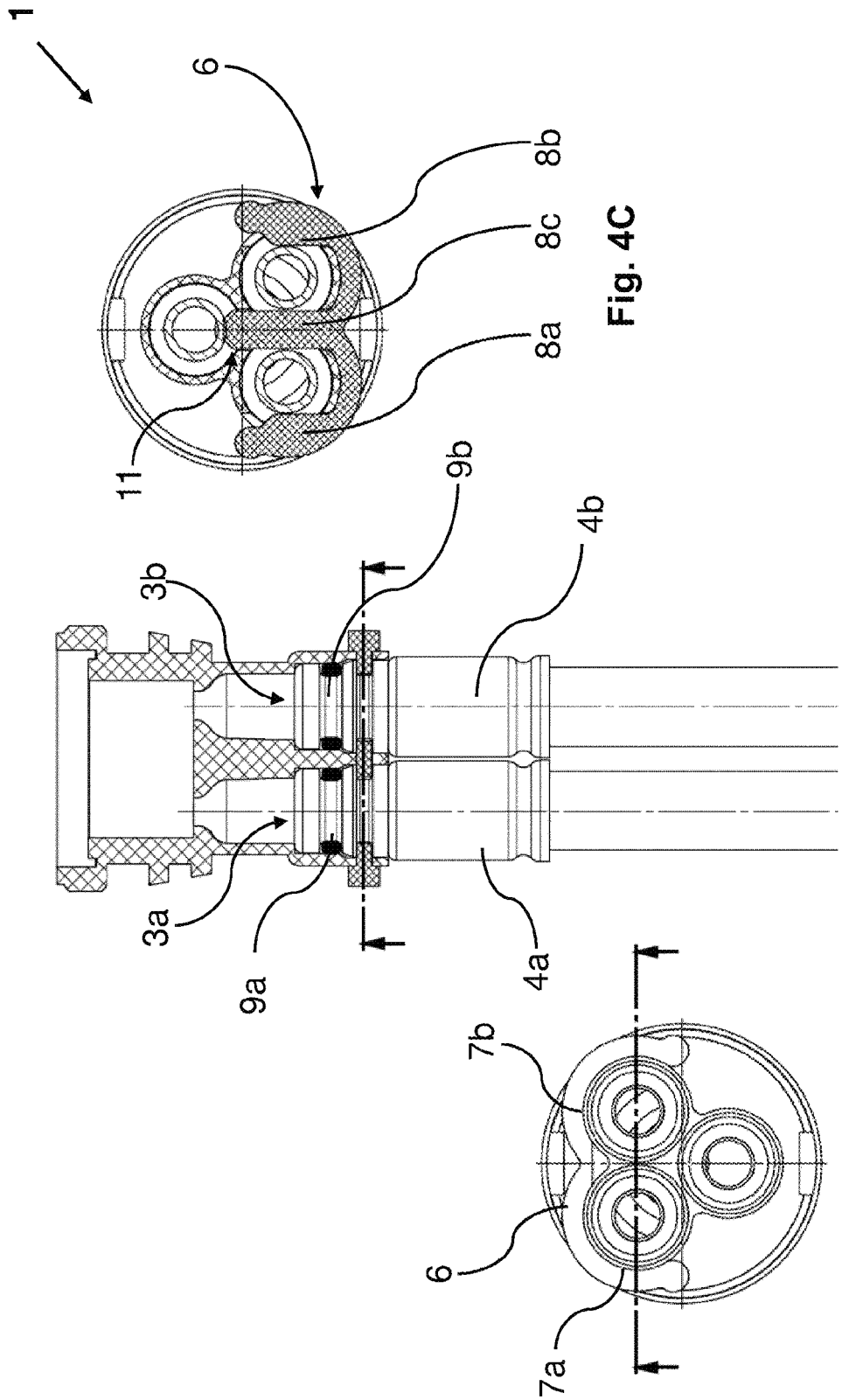
FIGS. 4A, 4B, and 4C show three sectional views of the hose connection in the assembled state.

FIGS. 4A, 4B, and 4C show three sectional views of the hose connection 1 in the state assembled with the clip 6 and the hose ends 4a, 4b. The same features are provided with the same reference signs.

Figure 5:
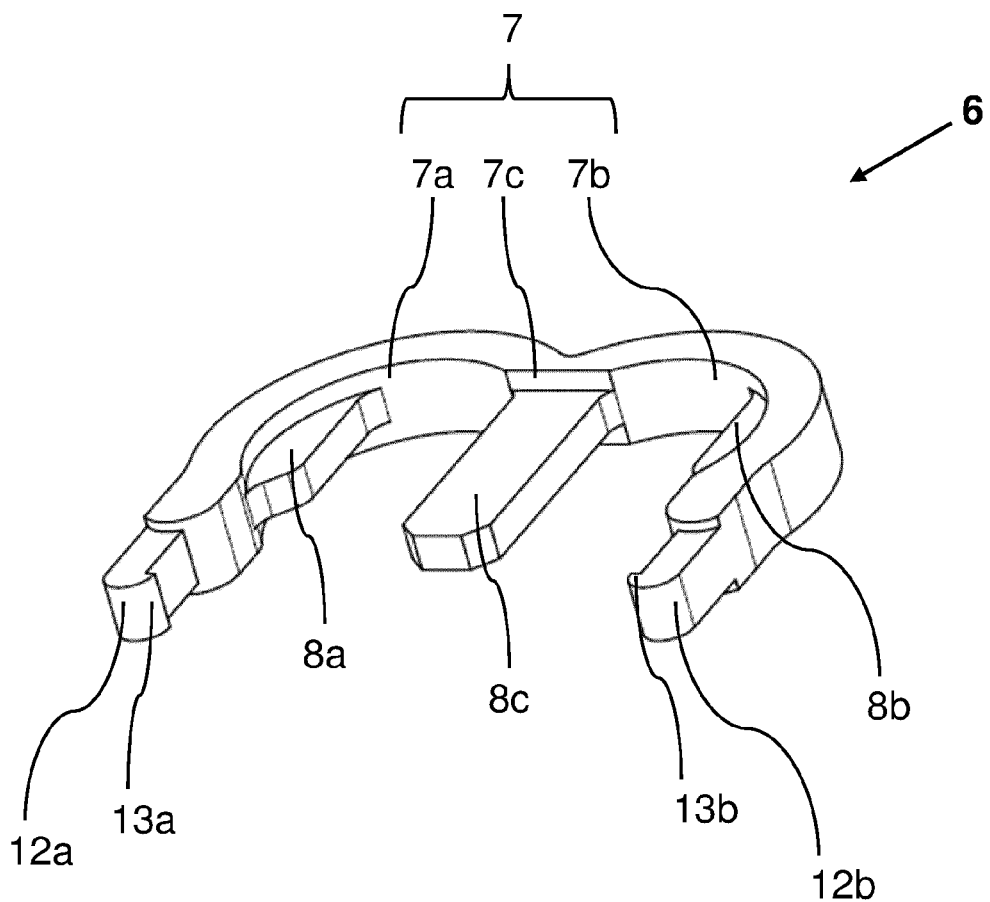
FIG. 5 shows a three-dimensional view of a clip in a second embodiment.

FIG. 5 shows the clip 6 in a second embodiment in a three-dimensional view. The same features are provided with the same reference signs. In addition to the features of the clip 6 described with reference to FIG. 3, the clip 6 comprises a first latching means 12a and a second latching means 12b or a first and a second pull-out safeguard mechanism 12a, 12b. The latching means 12a and 12b in each case are configured in the extension of one of the two outer locking projections 8a and 8b or in the extension of one of the first and second bearing surfaces 7a, 7b in the longitudinal direction. The latching means 12a and 12b are attached to the bearing surface 7 or attached in each case to one of the first and second bearing surfaces 7a, 7b. The latching means 12a and 12b protrude in a longitudinal direction of the locking projections 8a, 8b, 8c beyond the locking projections 8a, 8b, 8c. The first latching means 12a comprises a first protrusion 13a. The second latching means 12b comprises a second protrusion 13b.

Figure 6C:
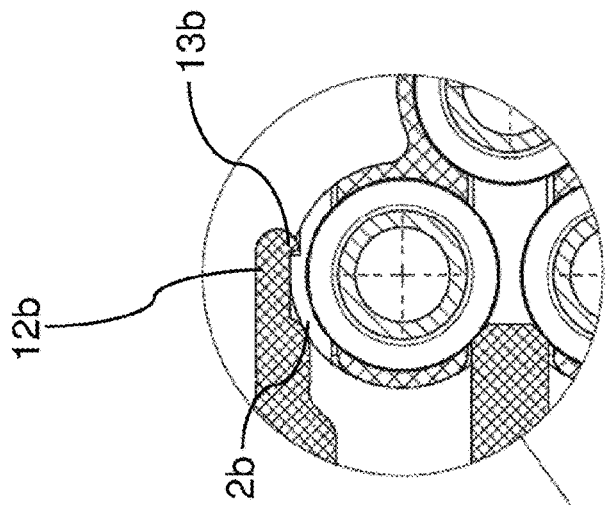
FIGS. 6B, 6C, and 6D show side and sectional views of the hose connection 1 with the clip in the second embodiment.
Figure 6B:
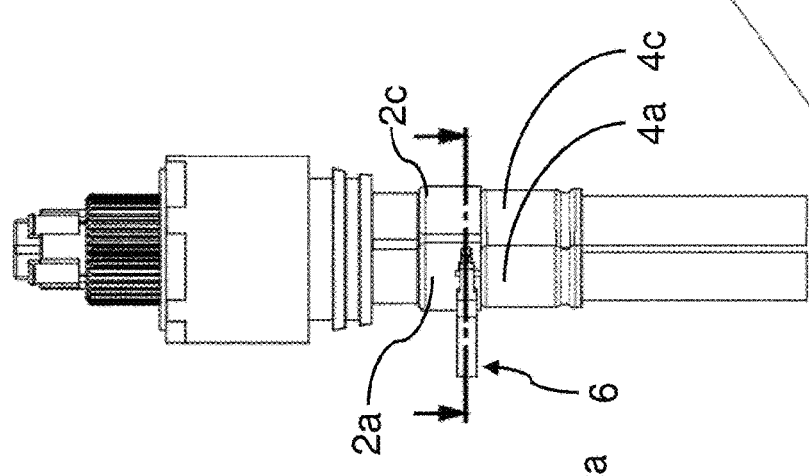
Figure 6D:
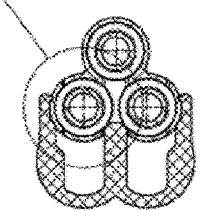
Figure 6A:
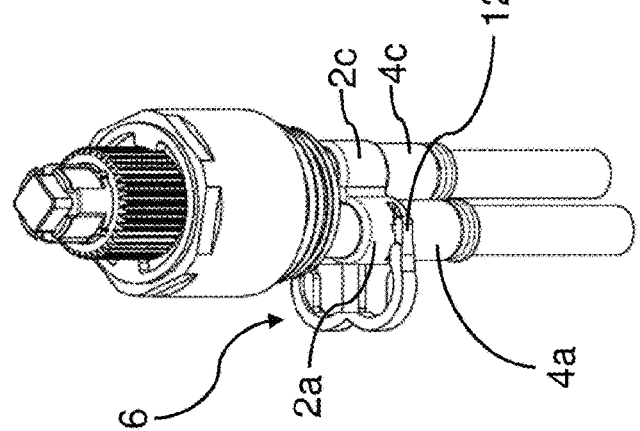
FIG. 6A shows a three-dimensional view of the hose connection with the clip 6 in the second embodiment.

FIG. 6A shows a three-dimensional view of a hose connection 1 with a clip 6 in the second embodiment. FIGS. 6B, 6C, and 6D show side and sectional views of a hose connection 1 with a clip 6 in the second embodiment. The same features are provided with the same reference signs.

As shown in FIGS. 6A, 6B, 6C, and 6D, the first housing 2a has an undercut or a latching opening in the region of the first hose receptacle 3a. In the assembled state of the clip 6 with the hose connection 1, the latching means 12a engages behind the undercut or engages in the latching opening of the first housing 2a. To this end, the first latching means 12a has a protrusion 13a corresponding to the undercut or the latching opening of the first housing 2a. Similarly, in the assembled state of the clip 6 with the hose connection 1, the latching means 12b engages behind an undercut or a latching opening of the second housing 2b. To this end, the second latching means 12b has a protrusion 13b corresponding to the undercut or the latching opening of the second housing 2b.

The latching means 12a, 12b lock the clip 6 in a latching position, as shown in FIG. 6. The latching means 12a, 12b prevent the clip 6 from being easily released from the housings 2a, 2b or from releasing itself. In the latching position, none of the locking projections 8a, 8b, 8c engages in or through one of the hose receptacles 3a, 3b, 3c of the hose connection 1. In particular, the central locking projection 8c does not extend through the hose receptacles 3a and 3b. In the example shown, the latching means 12a, 12b protrude beyond the locking projections 8a, 8b, 8c in a longitudinal direction of the locking projections 8a, 8b, 8c, in particular in a longitudinal direction transversely to the direction of introduction of a hose end into one of the hose receptacles 3a, 3b. In other words: the respective protrusion 13a, 13b of the latching means 12a, 12b protrudes beyond the locking projections 8a, 8b, 8c in a longitudinal direction of the locking projections 8a, 8b, 8c.

In the second embodiment, the clip 6 permits a positioning or locking of the clip 6 on the housings 2a, 2b so that the clip 6 does not extend through the hose receptacle 3a, 3b and thus the respective hose ends can be introduced into the hose receptacles.

LIST OF REFERENCE SIGNS

1 Hose connection
2a First housing
2b Second housing
2c Third housing
3a First hose receptacle
3b Second hose receptacle
3c Third hose receptacle
4a First hose end
4b Second hose end
4c Third hose end
5a First locking opening of first housing
5b First locking opening of second housing
6 Clip 7 Bearing surface
7a First bearing surface
7b Second bearing surface
8a First outer locking projection
8b Second outer locking projection
8c Central locking projection
9a Clip receptacle of first hose end
9b Clip receptacle of second hose end
9c Clip receptacle of third hose end
10a Second locking opening of first housing
10b Second locking opening of second housing
11 Locking opening of third housing
12a First latching means
12b Second latching means
13a First protrusion of first latching means
13b Second protrusion of second latching means

The invention claimed is:

1. A hose connection, comprising:
   at least one hose receptacle into which a hose end is introducible;
   a clip that extends through the at least one hose receptacle in order to engage in a clip receptacle of the hose end;
   the clip is designed configured to be self-retaining on the at least one hose receptacle;
   the at least one hose receptacle is one of three hose receptacles into which one respective hose end is introducible; and
   the clip comprises a plurality of locking projections which extend through the three hose receptacles,
   wherein one of the plurality of locking projections protrudes beyond another of the plurality of locking projections in a longitudinal direction.

2. The hose connection as claimed in claim 1, wherein the at least one hose receptacle is configured on a housing and the clip extends through the housing in a region of the at least one hose receptacle, and the clip is configured to be self-retaining on the housing in the region of the at least one hose receptacle.

3. The hose connection as claimed in claim 2, wherein the clip comprises at least one bearing surface which at least partially bears against the housing.

4. The hose connection as claimed in claim 1, wherein the clip is configured formed in one piece.

5. The hose connection as claimed in claim 1, wherein the clip is formed from a resilient material.

6. The hose connection as claimed in claim 1, wherein the plurality of locking projections comprises a first outer locking projection, a second outer locking projection and a central locking projection which extend through the three hose receptacles.

7. The hose connection as claimed in claim 6, wherein the clip comprises at least one bearing surface which at least partially bears against the housing, and at least one of a) at least one of the plurality of locking projections protrudes from the at least one bearing surface or b) the at least one bearing surface encloses the at least one of the plurality of locking projections.

8. The hose connection as claimed in claim 6, wherein the clip secures the first hose end on both sides by the first outer locking projection and the central locking projection, the second hose end on both sides by the second outer locking projection and the central locking projection, and the third hose end by the central locking projection.

9. The hose connection as claimed in claim 6, wherein the first outer locking projection engages in a first clip receptacle of the first hose end, the second outer locking projection engages in a second clip receptacle of the second hose end and the central locking projection engages in a third clip receptacle of the third hose end, the first clip receptacle and the second clip receptacle.

10. The hose connection as claimed in claim 6, wherein the first outer locking projection, the second outer locking projection and the central locking projection each engage in at least one respective clip receptacle of the respective hose ends.

11. The hose connection as claimed in claim 1, wherein the clip engages around the at least one hose receptacle of the three hose receptacles over at least half of a circumference.

12. The hose connection as claimed in claim 1, wherein the clip has at least one latching means, the at least one latching means locks the clip in at least one direction of movement of the clip.

13. The hose connection as claimed in claim 12, wherein the at least one latching means engages behind an undercut on or in a region of the at least one hose receptacle of the three hose receptacles.

14. The hose connection as claimed in claim 13, wherein the at least one latching means locks the clip in a latching position and the clip does not extend through the at least one hose receptacle of the three hose receptacles in the latching position.

15. A hose connection, comprising:
    at least one hose receptacle into which a hose end is introducible;
    a clip that extends through the at least one hose receptacle in order to engage in a clip receptacle of the hose end;
    the clip is designed configured to be self-retaining on the at least one hose receptacle;
    the at least one hose receptacle is one of three hose receptacles into which one respective hose end is introducible; and
    the clip comprises a plurality of locking projections which extend through the three hose receptacles,
    wherein the plurality of locking projections comprises a first outer locking projection, a second outer locking projection and a central locking projection which extend through the three hose receptacles, and
    wherein the clip comprises at least one bearing surface which at least partially bears against the housing, and at least one of a) at least one of the plurality of locking projections protrudes from the at least one bearing surface or b) the at least one bearing surface encloses the at least one of the plurality of locking projections.

16. A hose connection, comprising:
    at least one hose receptacle into which a hose end is introducible;
    a clip that extends through the at least one hose receptacle in order to engage in a clip receptacle of the hose end;
    the clip is designed configured to be self-retaining on the at least one hose receptacle;
    the at least one hose receptacle is one of three hose receptacles into which one respective hose end is introducible; and
    the clip comprises a plurality of locking projections which extend through the three hose receptacles,
    wherein the clip has at least one latching means, the at least one latching means locks the clip in at least one direction of movement of the clip.

17. The hose connection as claimed in claim 16, wherein the at least one latching means engages behind an undercut on or in a region of the at least one hose receptacle of the three hose receptacles.

18. The hose connection as claimed in claim 17, wherein the at least one latching means locks the clip in a latching position and the clip does not extend through the at least one hose receptacle of the three hose receptacles in the latching position.

19. The hose connection as claimed in claim 16, wherein the plurality of locking projections comprises a first outer locking projection, a second outer locking projection, and a central locking projection which extend through the three hose receptacles.

* * * * *